US012333103B2

(12) United States Patent
Takehara et al.

(10) Patent No.: US 12,333,103 B2
(45) Date of Patent: Jun. 17, 2025

(54) TOUCH PANEL AND DISPLAY DEVICE (71) Applicant: Sharp Display Technology Corporation, Kameyama (JP)

(72) Inventors: Yusuke Takehara, Kameyama (JP); Hiroto Akiyama, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/606,171

(22) Filed: Mar. 15, 2024

(65) Prior Publication Data

US 2024/0338099 A1 Oct. 10, 2024

(30) Foreign Application Priority Data

Apr. 10, 2023 (JP) ................................ 2023-063594

(51) Int. Cl.
*G06F 3/044* (2006.01)
*G06F 3/041* (2006.01)

(52) U.S. Cl.
CPC .......... *G06F 3/0412* (2013.01); *G06F 3/0443* (2019.05)

(58) Field of Classification Search
CPC ......... G06F 3/044–0448; G06F 3/0412; G06F 2203/04107
See application file for complete search history.

(56) References Cited

U.S. PATENT DOCUMENTS

| | | | | |
|---|---|---|---|---|
| 10,394,383 B2 * | 8/2019 | Ahn | ........................ | G06F 3/044 |
| 10,592,040 B2 * | 3/2020 | Chung | ................ | G02F 1/13306 |
| 10,649,263 B2 * | 5/2020 | Chung | .................. | G06F 3/0443 |
| 11,803,279 B2 * | 10/2023 | Sang | ........................ | G06F 3/044 |
| 2010/0321621 A1 * | 12/2010 | Kikuchi | .............. | G02F 1/13338 |
| | | | | 349/122 |
| 2012/0062511 A1 | 3/2012 | Ishizaki et al. | | |
| 2016/0334907 A1 | 11/2016 | Ishizaki et al. | | |
| 2018/0121022 A1 * | 5/2018 | Ahn | ........................ | G06F 3/044 |
| 2019/0064971 A1 | 2/2019 | Ishizaki et al. | | |
| 2019/0196240 A1 * | 6/2019 | Chung | .................... | G06F 3/044 |
| 2019/0196643 A1 * | 6/2019 | Chung | ................ | G02F 1/13338 |
| 2019/0310730 A1 | 10/2019 | Ishizaki et al. | | |
| 2021/0373695 A1 | 12/2021 | Ishizaki et al. | | |

(Continued)

FOREIGN PATENT DOCUMENTS

JP 2012-063839 A 3/2012

*Primary Examiner* — Patrick F Marinelli
(74) *Attorney, Agent, or Firm* — ScienBiziP, P.C.

(57) ABSTRACT

A touch panel includes a first substrate including a touch sensor electrode outputting a detection signal based on change in capacitance, and a pixel electrode, a second substrate disposed with a liquid crystal layer interposed between the second substrate and the first substrate and including a color filter, a high-resistance portion disposed over the touch sensor electrode, on an upper surface of the second substrate, a low-resistance portion disposed on a periphery surrounding the high-resistance portion on the upper surface of the second substrate, having resistance lower than resistance of the high-resistance portion, and connected to the high-resistance portion, and a conductive material connecting the low-resistance portion to a reference potential. The upper surface of the second substrate has a display region over the pixel electrode and a frame region on an outer side thereof. The touch sensor electrode is disposed beyond the display region to the frame region.

5 Claims, 6 Drawing Sheets (56) References Cited

U.S. PATENT DOCUMENTS

2023/0168778 A1\* 6/2023 Sang ................. G06F 3/044
                                                                             345/173
2024/0338099 A1\* 10/2024 Takehara ............ G06F 3/044

\* cited by examiner

TOUCH PANEL AND DISPLAY DEVICE

BACKGROUND

1. Field

The present disclosure relates to a touch panel and a display device.

2. Description of the Related Art

Transverse-electric-field in-cell liquid crystal panels include a first substrate including a liquid crystal driving circuit and touch electrodes, a second substrate that has a color filter (CF), and a liquid crystal layer between these substrates. In such in-cell liquid crystal panels, no electrodes are formed on the second substrate, and there is concern that display will be disturbed when the second substrate is charged with static electricity. This is because there are cases in which alignment of liquid crystal molecules in the liquid crystal layer is disturbed by an electric field due to the static electricity.

Japanese Unexamined Patent Application Publication No. 2012-63839 discloses a display device with a touch detection function, which is capable of reducing disturbing of the display even in a case in which static electricity is applied. This display device with a touch detection function includes a liquid crystal display element that performs display actions, a plurality of touch detection electrodes that are arrayed in parallel so as to extend in one direction and that each output detection signals based on change in capacitance in accordance with an external proximal object, a conductive film that is connected to the touch detection electrodes via insulation or high resistance and that is disposed so as to cover these touch detection electrodes, and a touch detection unit that detects external proximal objects by sampling the detection signals. Sheet resistance of the conductive film is no greater than a predetermined value, and a time constant of the conductive film is greater than a predetermined smallest time constant that is determined in accordance with sampling timing of the touch detection unit.

According to the display device with a touch detection function that is disclosed in Japanese Unexamined Patent Application Publication No. 2012-63839, the conductive film is disposed so as to cover the liquid crystal display element and the plurality of touch detection electrodes, and accordingly a conductive film has to be used in which the time constant is greater than the predetermined smallest time constant that is determined in accordance with the sampling timing of the touch detection unit. There is demand for a touch panel and a display device that can realize both detection sensitivity to touches and ease of discharging static electricity without such a conductive film.

SUMMARY

According to an embodiment, a touch panel includes a first substrate, including a touch sensor electrode that outputs a detection signal based on change in capacitance and a pixel electrode; a second substrate that is disposed with a liquid crystal layer interposed between the second substrate and the first substrate, and that includes a color filter, a high-resistance portion that is disposed over the touch sensor electrode, on an upper surface of the second substrate, a low-resistance portion that is disposed on a periphery surrounding the high-resistance portion on the upper surface of the second substrate, that has resistance lower than resistance of the high-resistance portion, and that is connected to the high-resistance portion, and a conductive material that connects the low-resistance portion to a reference potential, wherein the upper surface of the second substrate has a display region over the pixel electrode and a frame region on an outer side of the display region, and the touch sensor electrode is disposed beyond the display region to the frame region.

DESCRIPTION OF THE EMBODIMENTS

1. Outline of Touch Panel and Display Device (1) A touch panel according to an embodiment includes a first substrate including a touch sensor electrode that outputs a detection signal based on change in capacitance and a pixel electrode, a second substrate that is disposed with a liquid crystal layer interposed between the second substrate and the first substrate and that includes a color filter, a high-resistance portion that is disposed over the touch sensor electrode on an upper surface of the second substrate, a low-resistance portion that is disposed on a periphery surrounding the high-resistance portion on the upper surface of the second substrate, that has resistance lower than resistance of the high-resistance portion, and that is connected to the high-resistance portion, and a conductive material that connects the low-resistance portion to a reference potential. The upper surface of the second substrate has a display region over the pixel electrode and a frame region on an outer side of the display region. The touch sensor electrode is disposed beyond the display region to the frame region.

Due to the low-resistance portion being disposed on the periphery surrounding the high-resistance portion on the upper surface of the second substrate, charges with which the high-resistance portion is charged by static electricity travel to the low-resistance portion due to the difference in resistance. The low-resistance portion is connected to the reference potential by the conductive material, and accordingly the charges that travel to the low-resistance portion are quickly discharged through the conductive material. Accordingly, charging of the upper surface of the second substrate by static electricity is suppressed. As a result, disturbing of alignment of liquid crystal molecules in the liquid crystal layer by an electric field due to the static electricity is suppressed. Thus, disturbance of the display is suppressed. That is to say, according to this configuration, both detection sensitivity to touches and ease of discharging static electricity are realized in the touch panel.

Charges are removed from the low-resistance portion by the conductive material that connects the low-resistance portion to the reference potential being provided. Accordingly, the conductive material does not have to be disposed on the entire face or the entire periphery of the touch panel as a conductive film, for example. Thus, charges from static electricity can be effectively removed, even with touch panels in which disposing the conductive film on the entire surface or the entire periphery is difficult or positions where disposing can be performed are limited, and so forth, such as in touch panels with narrow frames or irregular shapes.

Due to the touch sensor electrodes being disposed beyond the display region and to the frame region, the touch sensor electrodes disposed in the frame region function as dummy electrodes. This enables effects of capacitance between the touch sensor electrodes and the low-resistance portion in the display region to be suppressed. Accordingly, static electricity can be discharged while securing uniformity in detection precision of touches in the display region.

(2) In the touch panel according to (1), the touch sensor electrode included in the first substrate may have a plurality of touch sensor electrodes that are disposed side by side in a first direction, and out of the plurality of touch sensor electrodes, at least a touch sensor electrode on an end may be disposed in the frame region. Accordingly, the display region can be made to be a region with higher detection precision to touches, as compared to, out of the plurality of touch sensor electrodes, touch sensor electrodes on at least the end.

(3) The touch panel according to (1) or (2) further includes a transparent electrode disposed so as to cover the touch sensor electrode. The high-resistance portion may be a first region of the transparent electrode over the touch sensor electrode, and the low-resistance portion may be a peripheral portion surrounding the first region of the transparent electrode. Accordingly, the high-resistance portion and the low-resistance portion are each realized by the first region and the second region of a single transparent electrode, thereby facilitating manufacturing.

(4) In the touch panel according to any one of (1) to (3), an end portion of the low-resistance portion may be disposed on an inner side from an end portion of the upper surface of the second substrate. Accordingly, even in a case in which an outer edge of the upper surface of the second substrate comes into contact with an enclosure or the like, the low-resistance portion is suppressed from coming into contact therewith. As a result, charges traveling from the high-resistance portion to the low-resistance portion can be suppressed from traveling to the object of contact, such as the enclosure or the like.

(5) A display device according to an embodiment includes a touch panel according to any one of (1) to (4), and a display unit that displays an image. The touch panel is disposed over a display face on which the display unit displays an image. Both detection sensitivity to touches and ease of transferring away static electricity are realized in the touch panel according to any one of (1) to (4). Accordingly, both high-quality display and high operability are realized in the display device equipped with this touch panel.

2. Example of Touch Panel and Display Device

First Embodiment

Description of Display Device

Figure 1:
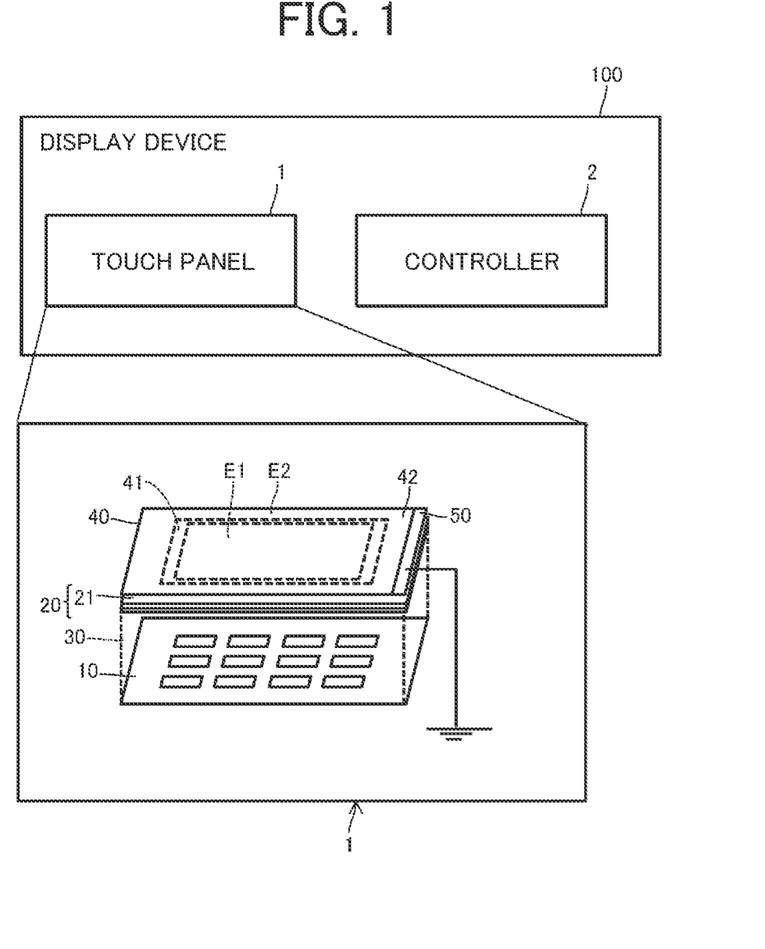
FIG. 1 is an outline configuration diagram of a display device according to an embodiment.

FIG. 1 is an outline configuration diagram of a display device 100 according to the present embodiment. The display device 100 is configured as, for example, a smartphone, a tablet terminal, a smartwatch, an in-vehicle information display, or a personal computer.

The display device 100 includes a touch panel 1 and a controller 2. The touch panel 1 is a full in-cell touch panel and is a capacitive touch panel. The touch panel 1 has a function of displaying images and a function of detecting touches from an indicator and touch positions thereof. The controller 2 executes each control processing in the display device 100 on the basis of touch positions acquired from the touch panel 1.

Description of Touch Panel

The touch panel 1 includes a first substrate 10, a second substrate 20 that is disposed with a liquid crystal layer 30 interposed between itself and the first substrate 10, and a transparent electrode 40 disposed on an upper surface of the second substrate 20. The second substrate 20 includes a color filter 21. The first substrate 10 includes touch sensor electrodes 12. The touch sensor electrodes 12 output detection signals that are based on change in capacitance.

The transparent electrode 40 is disposed so as to cover the touch sensor electrodes 12. To say that the transparent electrode 40 is disposed so as to cover the touch sensor electrodes 12 means that the transparent electrode 40 overlaps the touch sensor electrodes 12 in plan view. The transparent electrode 40 has a high-resistance portion 41 over the touch sensor electrodes 12, and a low-resistance portion 42 that is a peripheral portion surrounding the high-resistance portion 41 and that has resistance lower than that of the high-resistance portion 41. The low-resistance portion 42 is connected to a reference potential (ground) by a conductive material 50. That is to say, the low-resistance portion 42 is grounded.

Figure 2:
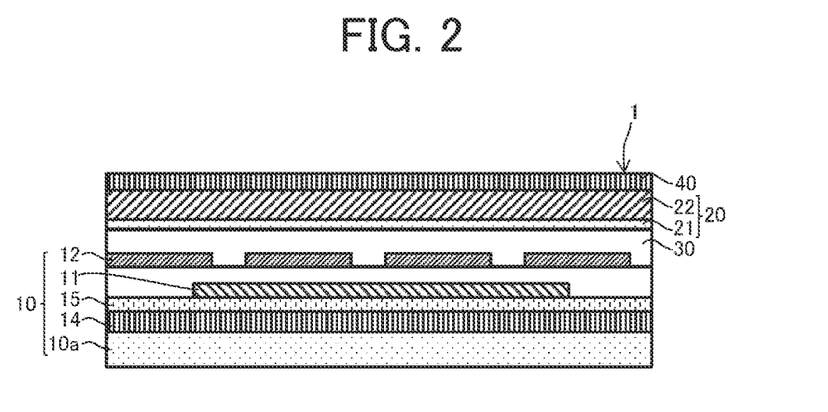
FIG. 2 is an outline sectional view of a touch panel included in the display device.

FIG. 2 is an outline sectional view of the touch panel 1. The touch panel 1 includes the first substrate 10, the second substrate 20, the liquid crystal layer 30 between the first substrate 10 and the second substrate 20, and the transparent electrode 40 disposed on the upper surface of the second substrate 20.

The second substrate 20 has the color filter 21. An upper surface of color filter 21 is covered by a glass substrate 22. The transparent electrode 40 is disposed on the upper surface of the second substrate 20, that is to say, on an upper surface of the glass substrate 22. The transparent electrode 40 is made of, for example, indium tin oxide (ITO), indium zinc oxide (IZO), or the like. An outermost layer of the transparent electrode 40 makes up a touch surface of the touch panel 1. The touch panel 1 accepts touch operations performed by an indicator such as a finger or the like, on the touch surface.

The driving mode of liquid crystal molecules included in the liquid crystal layer 30 is a transverse-electric-field driving mode. Accordingly, the first substrate 10 is an active matrix substrate and includes pixel electrodes 11 and the touch sensor electrodes 12 in order to form an electric field. The touch sensor electrodes 12 are provided in common with the pixel electrodes 11 and function as common electrodes that are disposed so as to face the plurality of pixel electrodes 11.

The first substrate 10 includes the touch sensor electrodes 12, the pixel electrodes 11, an insulating layer 15, a thin-film transistor layer 14, and a glass substrate 10a, disposed in that order from the touch surface side. The thin-film transistor layer 14 includes gate lines, a semiconductor layer, drain electrodes, source lines, and so forth, which are not illustrated. The touch sensor electrodes 12 are disposed so as to cover the pixel electrodes 11. That is to say, the touch sensor electrodes 12 are disposed so as to overlap the pixel electrodes 11 in plan view.

Figure 3:
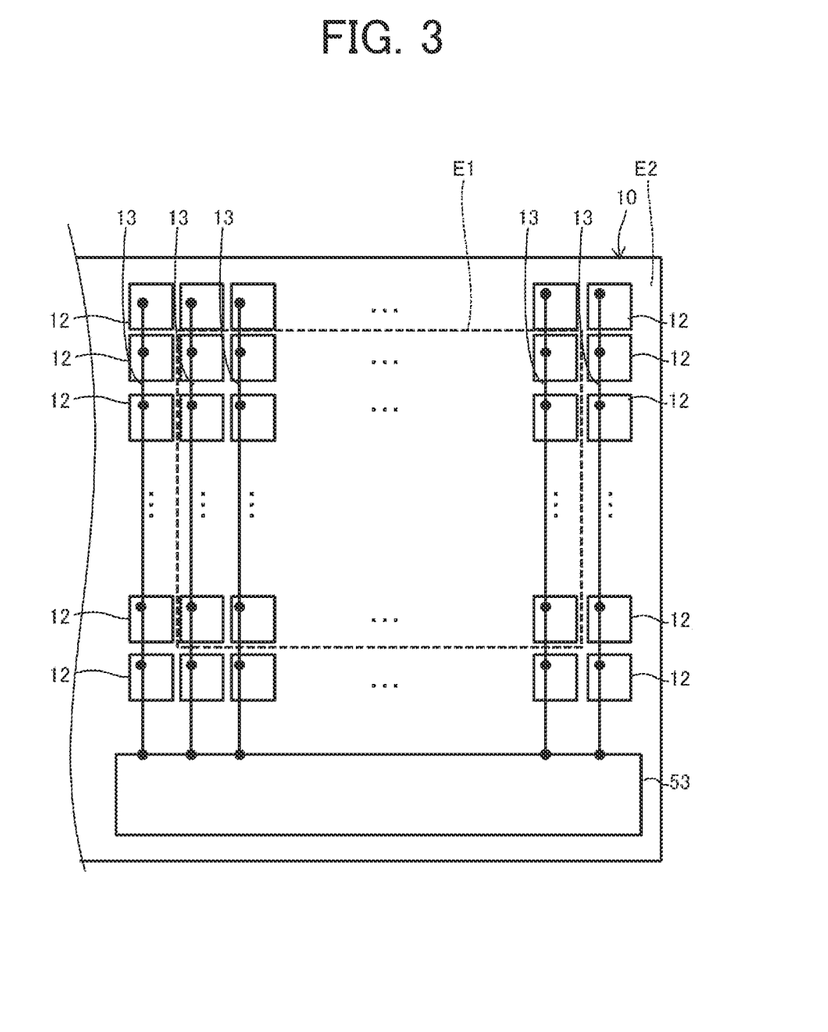
FIG. 3 is an outline plan view of a layer of the touch panel that includes touch sensor electrodes.

FIG. 3 is an outline plan view of a layer including the touch sensor electrodes 12 in the first substrate 10. The touch sensor electrodes 12 are disposed in the first substrate 10. The plurality of touch sensor electrodes 12 are disposed in a matrix. The plurality of touch sensor electrodes 12 include electrodes that function as drive electrodes and electrodes that function as detection electrodes.

The touch sensor electrodes 12 are transparent electrodes made of ITO, for example. As another example, the touch sensor electrodes 12 may be transparent electrodes made of IZO. Each of the plurality of touch sensor electrodes 12 outputs change in capacitance between itself and an adjacent touch sensor electrode 12, as a detection signal. Accordingly, the position of each of the plurality of touch sensor electrodes 12 disposed in a matrix is a coordinate representing a touch position. The touch sensor electrodes 12 are also disposed so as to face the pixel electrodes 11 connected to thin-film transistors and also serve as counter electrodes (common electrodes) that generate an electric field in the liquid crystal layer 30.

The touch surface that is the upper surface of the second substrate 20 has a display region E1, and a frame region E2 that is on an outer side of the display region E1. The display region E1 is a region in which the plurality of pixel electrodes 11 are disposed. The display region E1 is equivalent to a touch detection region in which, in a case of being touched by an indicator, the touch is detected by the touch sensor electrodes 12.

A touch detection driver 53 is further disposed in the first substrate 10. The touch detection driver 53 includes an integrated circuit that performs control processing related to touch detection. The plurality of touch sensor electrodes 12 are each connected to the touch detection driver 53 by touch signal lines 13.

The touch detection driver 53 supplies drive signals for detection to the plurality of touch sensor electrodes 12 via the touch signal lines 13, and also acquires the detection signals from the plurality of touch sensor electrodes 12 via the touch signal lines 13. The touch detection driver 53 detects touches by an indicator (e.g., a finger) on the basis of the detection signals. More specifically, the touch detection driver 53 detects touches by change in capacitance at each of the plurality of touch sensor electrodes 12. The touch detection driver 53 transmits detection results thereof to the controller 2 (see FIG. 1).

The touch sensor electrodes 12 are disposed in a matrix. The touch sensor electrodes 12 are disposed beyond the display region E1 to the frame region E2. That is to say, out of the plurality of touch sensor electrodes 12, at least touch sensor electrodes 12A disposed on an outermost periphery thereof are disposed in the frame region E2. In this case, the touch sensor electrodes 12A disposed in the frame region E2 are dummies. The term "dummy" indicates not being used for detecting touches.

Figure 4:
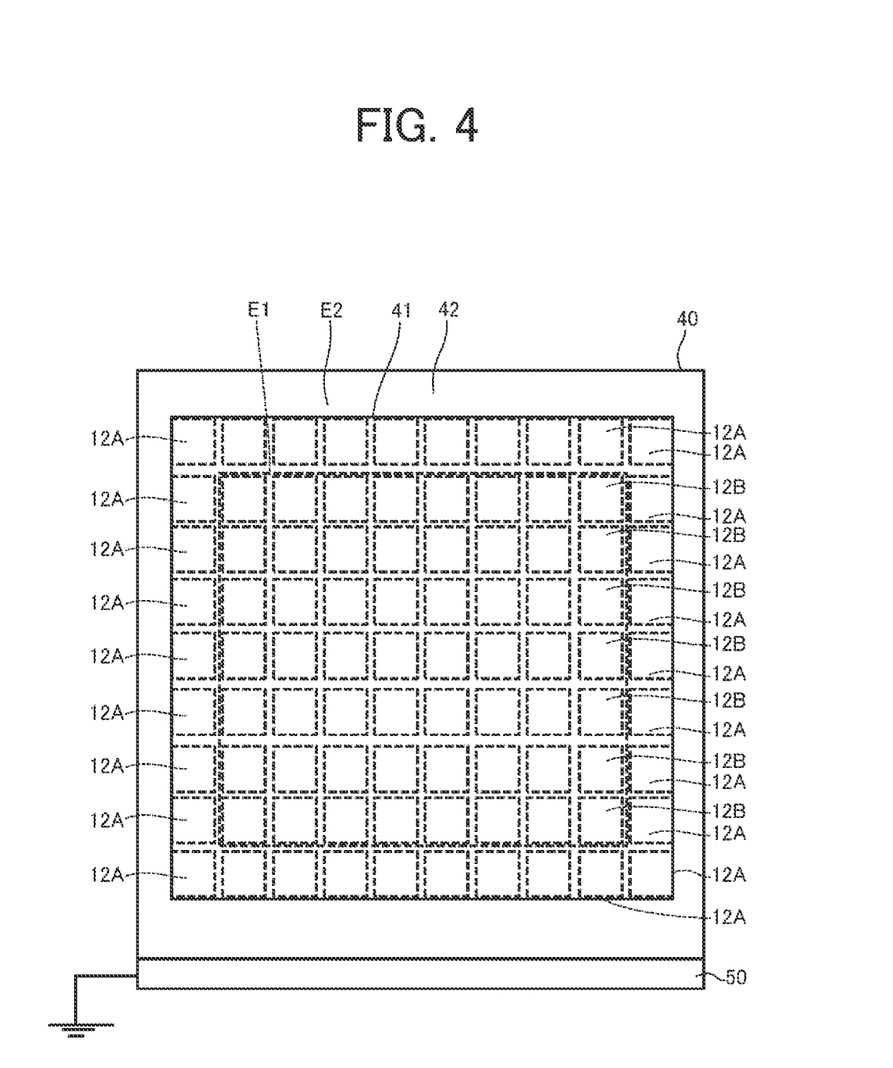
FIG. 4 is an outline plan view for describing a layout of the touch sensor electrodes.

FIG. 4 is an outline plan view for describing a layout of the touch sensor electrodes 12. Out of the plurality of touch sensor electrodes 12, the touch sensor electrodes 12A disposed on the outermost periphery thereof are disposed in the frame region E2, and the touch sensor electrodes 12B on the inner side therefrom are disposed in the display region E1. The high-resistance portion 41 of the transparent electrode 40 is disposed so as to cover the touch sensor electrodes 12.

The first substrate 10 has the touch detection driver 53. The touch detection driver 53 includes the integrated circuit that performs control processing related to touch detection. A plurality of drive electrodes 12A are each connected to the touch detection driver 53 by the touch signal lines 13. Also, a plurality of detection electrodes 12B are each connected to the touch detection driver 53 by the touch signal lines 13.

Configuration of Transparent Electrode

Figure 5:
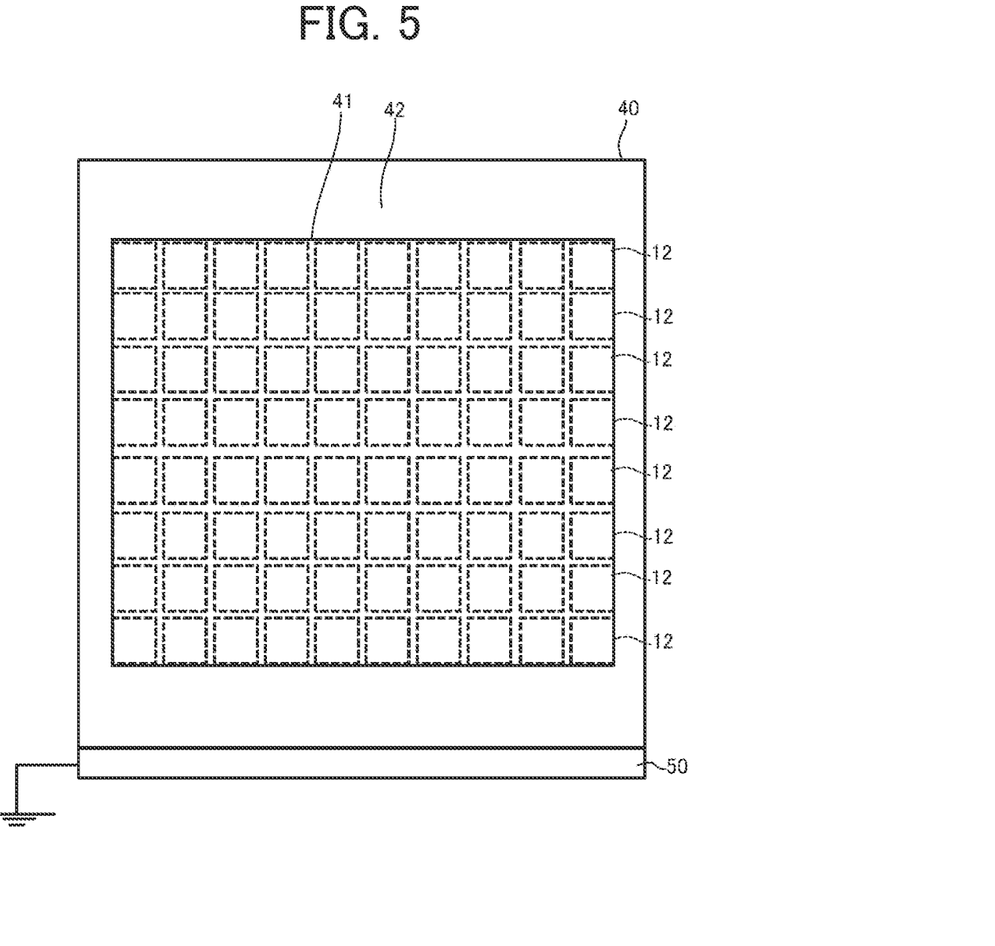
FIG. 5 is an outline plan view schematically illustrating a configuration of a transparent electrode included in the touch panel.

FIG. 5 is an outline plan view schematically illustrating a configuration of the transparent electrode 40. The transparent electrode 40 has the high-resistance portion 41 and the low-resistance portion 42. With respect to the high-resistance portion 41 and the low-resistance portion 42, the thickness of the transparent electrode 40 in the high-resistance portion 41 is greater than that in the low-resistance portion 42, for example. As another example, difference in resistance may be created by the transparent electrode 40 having different material composition ratios.

It is sufficient for the resistance of the high-resistance portion 41 to be a resistance value by which capacitance between the transparent electrode 40 and the touch sensor electrodes 12 is made to be sufficiently small. To say that the resistance value by which capacitance between the transparent electrode 40 and the touch sensor electrodes 12 is sufficiently small means a resistance value of a level that does not affect change in capacitance between an indicator and the touch sensor electrodes 12, due to touching with an indicator such as a finger or the like. It is sufficient for the resistance of the high-resistance portion 41 to be a resistance value by which capacitance between the transparent electrode 40 and the touch sensor electrodes 12 is made to be sufficiently small as compared to the capacitance between the indicator and the touch sensor electrodes 12. The resistance of the high-resistance portion 41 desirably is no lower than $10^7 \Omega$ or so. The low-resistance portion 42 is a peripheral portion that surrounds the high-resistance portion 41. The resistance of the low-resistance portion 42 is lower than that of the high-resistance portion 41. The resistance of the low-resistance portion 42 is desirably no higher than $10^2 \Omega$ or so.

The high-resistance portion 41 is a region over the touch sensor electrodes 12, and is a region covering the touch sensor electrodes 12. To say that the high-resistance portion 41 is a region over the touch sensor electrodes 12 means that the high-resistance portion 41 overlaps the touch sensor electrodes 12 in plan view.

The low-resistance portion 42 is connected to the conductive material 50. The conductive material 50 makes up a terminal-side low-resistance portion, and electrically connects the low-resistance portion 42 to the reference potential (ground) via a lead line. The conductive material 50 may be made of silver paste or made of a metal such as copper, gold, or the like, other than silver paste. For the conductive material 50 to connect to the low-resistance portion 42, the conductive material 50 may be disposed in contact with, for example, at least part of the low-resistance portion 42. For example, in the example in FIG. 5, the conductive material 50 is disposed in contact with one side of the low-resistance portion 42 that is the peripheral portion of the transparent electrode 40 that is rectangular, and is not disposed in contact with the other sides.

Effects of Embodiment

In the touch panel 1 according to the present embodiment, the transparent electrode 40 has the high-resistance portion 41 over the touch sensor electrodes 12, and thereby capacitance between the high-resistance portion 41 of the transparent electrode 40 and the touch sensor electrodes 12 becomes small. As a result, change in capacitance between an indicator and the touch sensor electrodes 12, due to touching with an indicator such as a finger or the like, is not impeded by capacitance between the transparent electrode 40 and the touch sensor electrodes 12. Thus, deterioration in detection precision of touches is suppressed.

In the touch panel 1 according to the present embodiment, due to the transparent electrode 40 being disposed on the upper surface of the second substrate 20, the transparent electrode 40 becomes charged with static electricity. Due to the transparent electrode 40 having the low-resistance portion 42 at the peripheral portion surrounding the high-resistance portion 41, charges by which the high-resistance portion 41 is charged travel to the low-resistance portion 42 due to the difference in resistance. The low-resistance portion 42 is grounded by the conductive material 50, and accordingly the charges with which the high-resistance portion 41 is charged are quickly discharged through the low-resistance portion 42 and the conductive material 50. Accordingly, charging of the upper surface of the second substrate 20 by static electricity is suppressed. As a result, disturbing of alignment of liquid crystal molecules in the liquid crystal layer 30 by an electric field due to the static electricity is suppressed. Consequently, disturbance of the display is suppressed.

In the touch panel 1 according to the present embodiment, the conductive material 50 is disposed for electrically connecting the low-resistance portion 42 and the reference potential. That is to say, no conductive film is disposed so as to cover the touch sensor electrodes 12 in the touch panel 1 according to the present embodiment, and accordingly both detection sensitivity to touches and ease of discharging static electricity are realized without having to use a special time constant.

In the touch panel 1 according to the present embodiment, the conductive material 50 is disposed for electrically connecting the low-resistance portion 42 and the reference potential. That is to say, in the touch panel 1 according to the present embodiment, the conductive material does not have to be disposed on the entire face or the entire periphery of the touch panel as a conductive film, for example. Accordingly, charges from static electricity can be effectively removed, even with touch panels in which disposing conductive film on the entire periphery is difficult or positions where disposing can be performed are limited, such as in touch panels with narrow frames or irregular shapes.

Further, in the touch panel 1 according to the present embodiment, disposing the touch sensor electrodes 12A on the outermost periphery in the frame region E2 enables effects of capacitance between the touch sensor electrodes 12A and the low-resistance portion 42 in the display region E1 to be suppressed. Accordingly, static electricity can be transferred away while securing uniformity in detection precision of touches in the display region E1. This will be described in detail by way of comparison with a touch panel 1a according to a comparative example.

Figure 6:
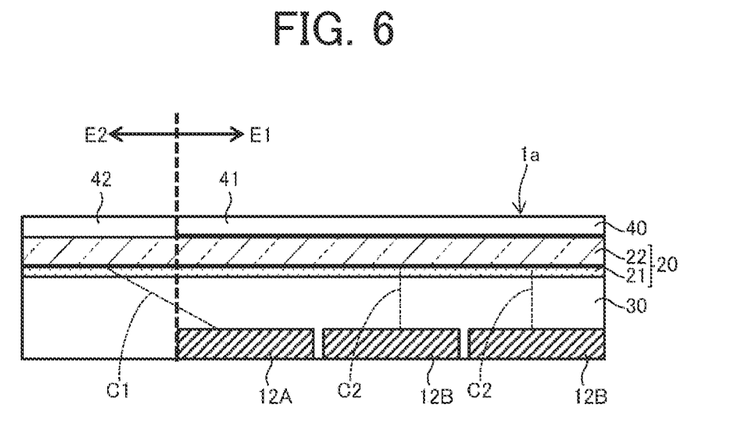
FIG. 6 is a schematic diagram of a touch panel according to a comparative example.

FIG. 6 is a schematic diagram of the touch panel 1a according to the comparative example. In the touch panel 1a according to the comparative example, the touch sensor electrodes 12 are disposed in the display region E1 in a matrix. In this case, out of the plurality of touch sensor electrodes 12, the touch sensor electrodes 12A disposed on the outermost periphery exhibit capacitive coupling with the low-resistance portion 42 on the peripheral portion of the transparent electrode 40.

Capacitance C1 between the touch sensor electrodes 12A disposed on the outermost periphery and the low-resistance portion 42 is greater than capacitance C2 between the touch sensor electrodes 12B on an inner side therefrom and the high-resistance portion 41. Accordingly, in the touch panel 1a according to the comparative example, a case is conceivable in which the capacitance at the touch sensor electrodes 12A is affected by the capacitance C1, and becomes greater than the capacitance at the touch sensor electrodes 12B. The reason is that the magnitude of capacitance is inversely proportionate to distance, and accordingly the effects of the low-resistance portion 42 on the capacitance at the touch sensor electrodes 12B is small.

Figure 7:
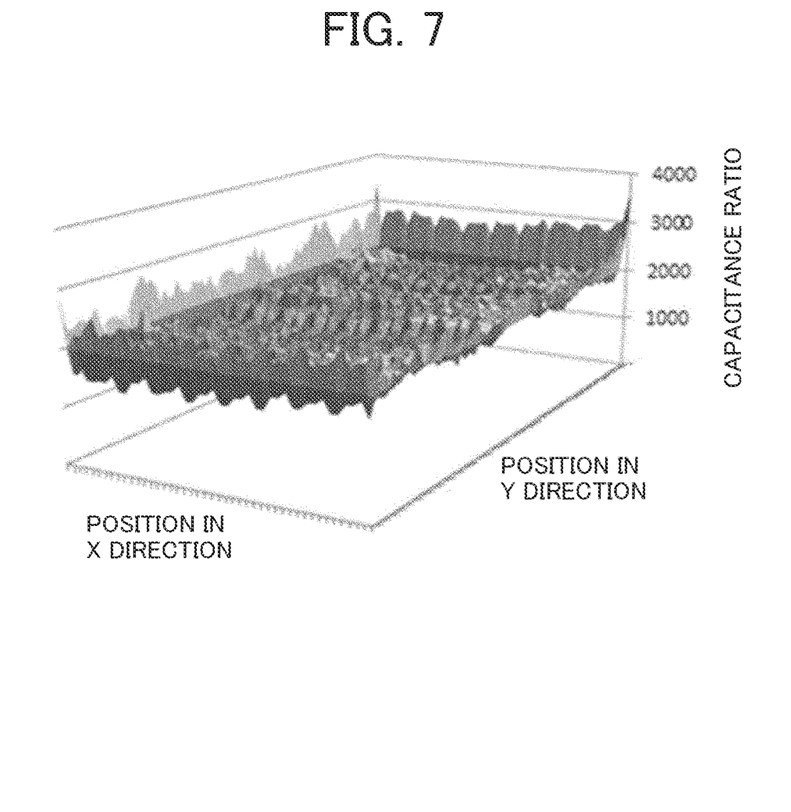
FIG. 7 is a diagram showing calculation results of magnitude of capacitance between the detection electrodes of the touch panel according to the comparative example and drive electrodes that are adjacent thereto.

FIG. 7 is a diagram showing calculation results of magnitude of capacitance at the touch sensor electrodes 12 of the touch panel 1a according to the comparative example. The height-wise axis in FIG. 7 represents the magnitude of the capacitance, and the further upward, the greater the capacitance is. In the touch panel 1a according to the comparative example, the capacitance of the touch sensor electrodes 12A disposed on the outermost periphery is greater than the capacitance of the touch sensor electrodes 12B on the inner side therefrom. Accordingly, in the touch panel 1a according to the comparative example, the possibility that variance in detection sensitivity to touches will occur in the display region E1 is conceivable. That is to say, in the touch panel 1a according to the comparative example, the possibility that detection precision of touches at an edge portion on the inner side of the display region E1 will be lower in comparison with detection precision on the inner side therefrom is conceivable.

Figure 8:
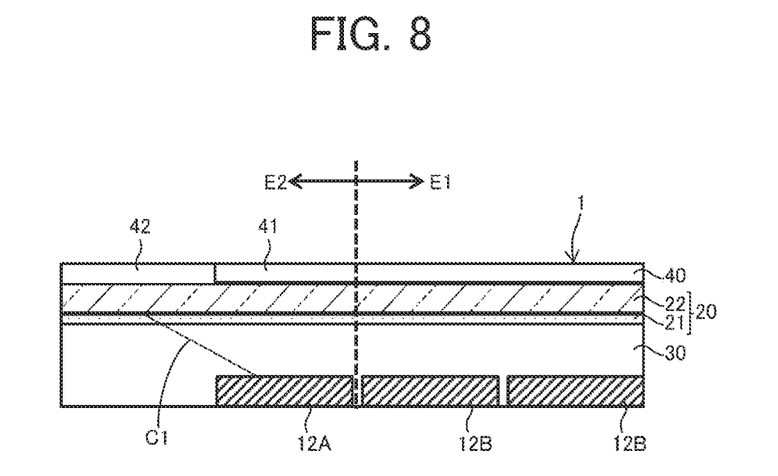
FIG. 8 is a schematic diagram of the touch panel according to the embodiment.

In contrast with this, FIG. 8 is a schematic diagram of the touch panel 1 according to the present embodiment. In the touch panel 1 according to the present embodiment, out of the plurality of touch sensor electrodes 12, the touch sensor electrodes 12A disposed on the outermost periphery are disposed in the frame region E2 and situated outside the display region E1. Accordingly, in the touch panel 1 according to the present embodiment, the touch sensor electrodes 12A that exhibit capacitive coupling with the low-resistance portion 42 are not situated in the display region E1. Thus, in the touch panel 1 according to the present embodiment, the touch sensor electrodes disposed in the display region E1 (touch sensor electrodes 12B) are less readily affected by the capacitance C1 as compared to the touch panel 1a according to the comparative example.

Note that in this case, the touch sensor electrodes 12A disposed in the frame region E2 are dummies, and accordingly the size of the touch sensor electrodes 12A desirably is a size such that effects of the capacitance C1 do not reach the positions of the touch sensor electrodes 12B. For example, the size of the touch sensor electrodes 12A is no less than 1 mm or so.

Second Embodiment

Figure 9:
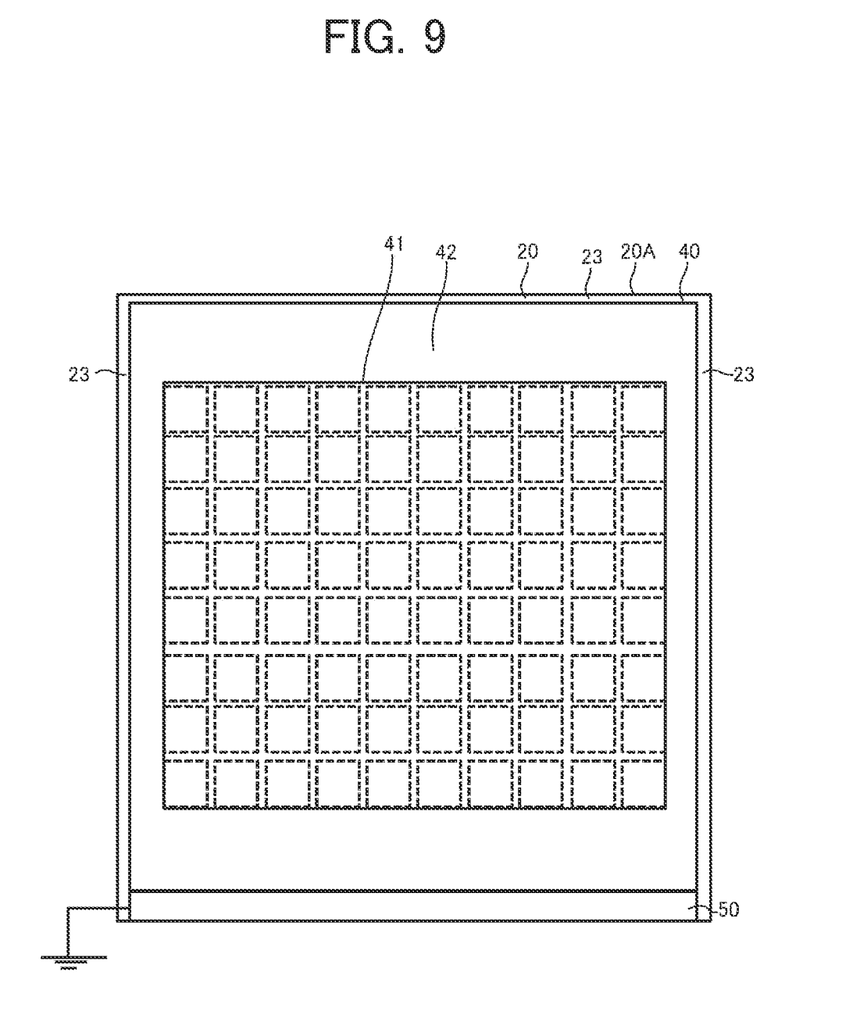
FIG. 9 is an outline plan view for describing a layout of a transparent electrode in a touch panel according to a second embodiment.

In a touch panel 1 according to a second embodiment, a transparent electrode 40 is disposed such that an end portion thereof is on an inner side from an end portion of an upper surface of a second substrate 20. FIG. 9 is an outline plan view for describing a layout of the transparent electrode 40 in the touch panel 1 according to the second embodiment. In the touch panel 1 according to the second embodiment, the transparent electrode 40 is disposed on an inner side from an outer edge 20A of the second substrate 20. Accordingly, the upper surface of the second substrate 20 has an electrodeless region 23 where the transparent electrode 40 is not disposed, on the inner side of the outer edge 20A.

Accordingly, even in a case in which the outer edge 20A of the upper surface of the second substrate 20 comes into contact with an enclosure or the like, the electrodeless region 23 comes into contact therewith, without the low-resistance portion 42 coming into contact therewith. Thus, charges traveling from the high-resistance portion 41 to the low-resistance portion 42 can be suppressed from traveling to the object of contact, such as the enclosure or the like.

Modifications

Note that while the high-resistance portion 41 and the low-resistance portion 42 have been described above as being realized as regions of a single transparent electrode 40, these members do not necessarily have to be the single transparent electrode 40. Instead of the transparent electrode 40, the touch panel 1 may have, for example, a high-resistance member disposed over the touch sensor electrodes 12, and a low-resistance member that is disposed around the high-resistance member and that is grounded by the conductive material 50, which are connected. In this case as well, charges by which the high-resistance member is charged travel to the low-resistance member due to difference in resistance, and are quickly discharged through the conductive material 50.

3. Appendix

The present disclosure is not limited to the above embodiments, and various modifications can be made.

The present disclosure contains subject matter related to that disclosed in Japanese Priority Patent Application JP 2023-063594 filed in the Japan Patent Office on Apr. 10, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A touch panel, comprising:
a first substrate, including
a touch sensor electrode that outputs a detection signal based on change in capacitance and a pixel electrode;
a second substrate that is disposed with a liquid crystal layer interposed between the second substrate and the first substrate, and that includes a color filter;
a high-resistance portion that is disposed over the touch sensor electrode, on an upper surface of the second substrate;
a low-resistance portion that is disposed on a periphery surrounding the high-resistance portion on the upper surface of the second substrate, that has resistance lower than resistance of the high-resistance portion, and that is connected to the high-resistance portion; and
a conductive material that connects the low-resistance portion to a reference potential, wherein
the upper surface of the second substrate has a display region over the pixel electrode and a frame region on an outer side of the display region, and
the touch sensor electrode is disposed beyond the display region to the frame region.

2. The touch panel according to claim 1, wherein
the touch sensor electrode included in the first substrate has a plurality of touch sensor electrodes that are disposed side by side in a first direction, and
out of the plurality of touch sensor electrodes, at least a touch sensor electrode on an end is disposed in the frame region.

3. The touch panel according to claim 1, further comprising:
a transparent electrode disposed so as to cover the touch sensor electrode, wherein
the high-resistance portion is a first region of the transparent electrode over the touch sensor electrode, and
the low-resistance portion is a peripheral portion surrounding the first region of the transparent electrode.

4. The touch panel according to claim 1, wherein
an end portion of the low-resistance portion is disposed on an inner side from an end portion of the upper surface of the second substrate.

5. A display device, comprising:
a touch panel according to claim 1; and
a display unit that displays an image, wherein
the touch panel is disposed over a display face on which the display unit displays an image.

* * * * *